(12) United States Patent
Schmisseur et al.

(10) Patent No.: US 10,649,813 B2
(45) Date of Patent: May 12, 2020

(54) ARBITRATION ACROSS SHARED MEMORY POOLS OF DISAGGREGATED MEMORY DEVICES

(71) Applicant: Intel Corporation, Santa Clara, CA (US)

(72) Inventors: Mark A. Schmisseur, Phoenix, AZ (US); Francesc Guim Bernat, Barcelona (ES); Andrew J. Herdrich, Hillsboro, OR (US); Karthik Kumar, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 51 days.

(21) Appl. No.: 15/929,005

(22) Filed: Mar. 29, 2018

(65) Prior Publication Data

US 2019/0050261 A1 Feb. 14, 2019

(51) Int. Cl.
*G06F 9/50* (2006.01)
*H04L 12/24* (2006.01)
*G06F 9/48* (2006.01)
*G06F 9/54* (2006.01)
*H04L 12/26* (2006.01)

(52) U.S. Cl.
CPC .......... *G06F 9/5038* (2013.01); *G06F 9/4881* (2013.01); *G06F 9/5072* (2013.01); *G06F 9/5077* (2013.01); *G06F 9/544* (2013.01); *H04L 41/0896* (2013.01); *H04L 43/0817* (2013.01); *H04L 43/0876* (2013.01); *H04L 41/0816* (2013.01)

(58) Field of Classification Search
CPC ...... G06F 9/5038; G06F 9/5072; G06F 9/544; G06F 9/4881; G06F 9/5077; H04L 43/0876; H04L 43/0817; H04L 41/0896; H04L 41/0816
See application file for complete search history.

(56) References Cited

U.S. PATENT DOCUMENTS

| | | | |
|---|---|---|---|
| 2007/0067528 A1* | 3/2007 | Schaffer | G06F 13/362 710/116 |
| 2007/0156946 A1* | 7/2007 | Lakshmanamurthy | G06F 13/1631 711/5 |
| 2012/0226805 A1* | 9/2012 | Rojahn | H04L 41/0896 709/224 |
| 2014/0201471 A1* | 7/2014 | Cutter | G06F 13/1663 711/151 |
| 2017/0293447 A1* | 10/2017 | Bivens | G06F 3/0619 |

* cited by examiner

*Primary Examiner* — Francisco A Grullon
(74) *Attorney, Agent, or Firm* — Thorpe North & Western, LLP (57) ABSTRACT

Technology for a memory pool arbitration apparatus is described. The apparatus can include a memory pool controller (MPC) communicatively coupled between a shared memory pool of disaggregated memory devices and a plurality of compute resources. The MPC can receive a plurality of data requests from the plurality of compute resources. The MPC can assign each compute resource to one of a set of compute resource priorities. The MPC can send memory access commands to the shared memory pool to perform each data request prioritized according to the set of compute resource priorities. The apparatus can include a priority arbitration unit (PAU) communicatively coupled to the MPC. The PAU can arbitrate the plurality of data requests as a function of the corresponding compute resource priorities.

22 Claims, 7 Drawing Sheets

ARBITRATION ACROSS SHARED MEMORY POOLS OF DISAGGREGATED MEMORY DEVICES

BACKGROUND

Memory devices are typically provided in various forms and implementations in computers as well as other electronic devices. There are many different types of memory including volatile memory, such as dynamic random-access memory (DRAM) and synchronous dynamic random access memory (SDRAM), for example, and non-volatile memory such as flash memory, for example.

Flash memory devices typically use a one-transistor memory cell that allows for high memory densities, high reliability, and low power consumption. Changes in threshold voltage of the cells, through programming of a charge storage node (e.g., a floating gate or charge trap) determine the data state of each cell. Other non-volatile memories such as phase change (PRAM) use other physical phenomena such as a physical material change or polarization to determine the data state of each cell. Common uses for flash and other solid state memories include personal computers, digital cameras, digital media players, digital recorders, games, appliances, vehicles, wireless devices, cellular telephones, and removable portable memory modules to name a few.

BRIEF DESCRIPTION OF THE DRAWINGS

Features and advantages of invention embodiments will be apparent from the detailed description which follows, taken in conjunction with the accompanying drawings, which together illustrate, by way of example, invention features; and, wherein.

Reference will now be made to the exemplary embodiments illustrated, and specific language will be used herein to describe the same. It will nevertheless be understood that no limitation on invention scope is thereby intended.

DESCRIPTION OF EMBODIMENTS

Before the disclosed invention embodiments are described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular examples or embodiments only and is not intended to be limiting. The same reference numerals in different drawings represent the same element. Numbers provided in flow charts and processes are provided for clarity in illustrating steps and operations and do not necessarily indicate a particular order or sequence.

Furthermore, the described features, structures, or characteristics can be combined in any suitable manner in one or more embodiments. In the following description, numerous specific details are provided, such as examples of layouts, distances, network examples, etc., to provide a thorough understanding of various invention embodiments. One skilled in the relevant art will recognize, however, that such detailed embodiments do not limit the overall inventive concepts articulated herein, but are merely representative thereof. One skilled in the relevant art will additionally recognize that the technology can be practiced without one or more of the specific details, or with other methods, components, layouts, etc. In other instances, well-known structures, materials, or operations may not be shown or described in detail to avoid obscuring aspects of the disclosure.

Reference throughout this specification to "an example" means that a particular feature, structure, or characteristic described in connection with the example is included in at least one embodiment of the present invention. Thus, appearances of the phrases "in an example" or "an embodiment" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations under the present disclosure.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open ended term in this specification, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

As used herein, comparative terms such as "increased," "decreased," "better," "worse," "higher," "lower," "enhanced," and the like refer to a property of a device, component, or activity that is measurably different from other devices, components, or activities in a surrounding or adjacent area, in a single device or in multiple comparable devices, in a group or class, in multiple groups or classes, or as compared to the known state of the art. For example, a data region that has an "increased" risk of corruption can refer to a region of a memory device which is more likely to have write errors to it than other regions in the same memory device. A number of factors can cause such increased risk, including location, fabrication process, number of program pulses applied to the region, etc.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

Numerical amounts and data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 1.5, 2, 2.3, 3, 3.8, 4, 4.6, 5, and 5.1 individually.

This same principle applies to ranges reciting only one numerical value as a minimum or a maximum. Furthermore, such an interpretation should apply regardless of the breadth of the range or the characteristics being described.

An initial overview of technology embodiments is provided below and then specific technology embodiments are described in further detail later. This initial summary is intended to aid readers in understanding the technology more quickly, but is not intended to identify key or essential technological features nor is it intended to limit the scope of the claimed subject matter. Unless defined otherwise, all technical and scientific terms used herein have the same meaning as commonly understood by one of ordinary skill in the art to which this disclosure belongs.

In one configuration, a data center can include memory pool(s) of volatile memory, nonvolatile memory (NVM), or a combination thereof. Volatile memory can include any type of volatile memory, and is not considered to be limiting. Volatile memory is a storage medium that requires power to maintain the state of data stored by the medium. Non-limiting examples of volatile memory can include random access memory (RAM), such as static random-access memory (SRAM), dynamic random-access memory (DRAM), synchronous dynamic random-access memory (SDRAM), and the like, including combinations thereof. SDRAM memory can include any variant thereof, such as single data rate SDRAM (SDR DRAM), double data rate (DDR) SDRAM, including DDR, DDR2, DDR3, DDR4, DDR5, and so on, described collectively as DDRx, and low power DDR (LPDDR) SDRAM, including LPDDR, LPDDR2, LPDDR3, LPDDR4, and so on, described collectively as LPDDRx. In some examples, DRAM complies with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209B for LPDDR SDRAM, JESD209-2F for LPDDR2 SDRAM, JESD209-3C for LPDDR3 SDRAM, and JESD209-4A for LPDDR4 SDRAM (these standards are available at www.jedec.org; DDR5 SDRAM is forthcoming). Such standards (and similar standards) may be referred to as DDR-based or LPDDR-based standards, and communication interfaces that implement such standards may be referred to as DDR-based or LPDDR-based interfaces. In one specific example, the system memory can be DRAM. In another specific example, the system memory can be DDRx SDRAM. In yet another specific aspect, the system memory can be LPDDRx SDRAM.

NVM is a storage medium that does not require power to maintain the state of data stored by the medium. NVM has traditionally been used for the task of data storage, or long-term persistent storage, but new and evolving memory technologies allow the use of NVM in roles that extend beyond traditional data storage. One example of such a role is the use of NVM as main or system memory. Non-volatile system memory (NVMsys) can combine data reliability of traditional storage with ultra-low latency and high bandwidth performance, having many advantages over traditional volatile memory, such as high density, large capacity, lower power consumption, and reduced manufacturing complexity, to name a few. Byte-addressable, write-in-place NVM such as three-dimensional (3D) cross-point memory, for example, can operate as byte-addressable memory similar to dynamic random-access memory (DRAM), or as block-addressable memory similar to NAND flash. In other words, such NVM can operate as system memory or as persistent storage memory (NVMstor). In some situations where NVM is functioning as system memory, stored data can be discarded or otherwise rendered unreadable when power to the NVMsys is interrupted. NVMsys also allows increased flexibility in data management by providing non-volatile, low-latency memory that can be located closer to a processor in a computing device. In some examples, NVMsys can reside on a DRAM bus, such that the NVMsys can provide ultra-fast DRAM-like access to data. NVMsys can also be useful in computing environments that frequently access large, complex data sets, and environments that are sensitive to downtime caused by power failures or system crashes.

Non-limiting examples of NVM can include planar or three-dimensional (3D) NAND flash memory, including single or multi-threshold-level NAND flash memory, NOR flash memory, single or multi-level Phase Change Memory (PCM), such as chalcogenide glass PCM, planar or 3D PCM, cross-point array memory, including 3D cross-point memory, non-volatile dual in-line memory module (NVDIMM)-based memory, such as flash-based (NVDIMM-F) memory, flash/DRAM-based (NVDIMM-N) memory, persistent memory-based (NVDIMM-P) memory, 3D cross-point-based NVDIMM memory, resistive RAM (ReRAM), including metal-oxide- or oxygen vacancy-based ReRAM, such as $HfO_2$-, $Hf/HfO_x$-, $Ti/HfO_2$-, $TiO_x$-, and $TaO_x$-based ReRAM, filament-based ReRAM, such as $Ag/GeS_2$-, $ZrTe/Al_2O_3$-, and Ag-based ReRAM, programmable metallization cell memory, such as conductive-bridging RAM (CBRAM), silicon-oxide-nitride-oxide-silicon (SONOS) memory, ferroelectric RAM (FeRAM), ferroelectric transistor RAM (Fe-TRAM), anti-ferroelectric memory, polymer memory (e.g., ferroelectric polymer memory), magnetoresistive RAM (MRAM), write-in-place non-volatile MRAM (NVMRAM), spin-transfer torque (STT) memory, spin-orbit torque (SOT) memory, nanowire memory, electrically erasable programmable read-only memory (EEPROM), nanotube RAM (NRAM), other memristor- and thyristor-based memory, spintronic magnetic junction-based memory, magnetic tunneling junction (MTJ)-based memory, domain wall (DW)-based memory, and the like, including combinations thereof. The term "memory device" can refer to the die itself and/or to a packaged memory product. NVM can be byte or block addressable. In some examples, NVM can comply with one or more standards promulgated by the Joint Electron Device Engineering Council (JEDEC), such as JESD21-C, JESD218, JESD219, JESD220-1, JESD223B, JESD223-1, or other suitable standard (the JEDEC standards cited herein are available at www.jedec.org). In one specific example, the NVM can be 3D cross-point memory. In another specific example, the memory can be NAND or 3D NAND memory. In another specific example, the system memory can be STT memory.

In one configuration, a data center can utilize resource pool(s), such as memory pool(s), to improve data center efficiency. For example, a memory pool can provide increased flexibility when reading/writing data from/to memory within the memory pool and can result in increased utilization of underutilized memory within the memory pool. Compute nodes (e.g., processors or cores) in the data center can read/write data from/to memory within the memory pool(s) in the data center.

In one example, the compute node(s) in the data center can be guaranteed or assured a defined bandwidth according to, for example, a service level agreement (SLA), quality of service (QoS) arrangement, or the like, when reading/writing data from/to memory within the memory pool. For example, as described in further detail below, a data center management technique can be employed such that a defined bandwidth can be allocated for specific compute nodes or groups of compute nodes in the data center when performing workloads that involve reading/writing data from/to memory within the memory pool.

Figure 1:
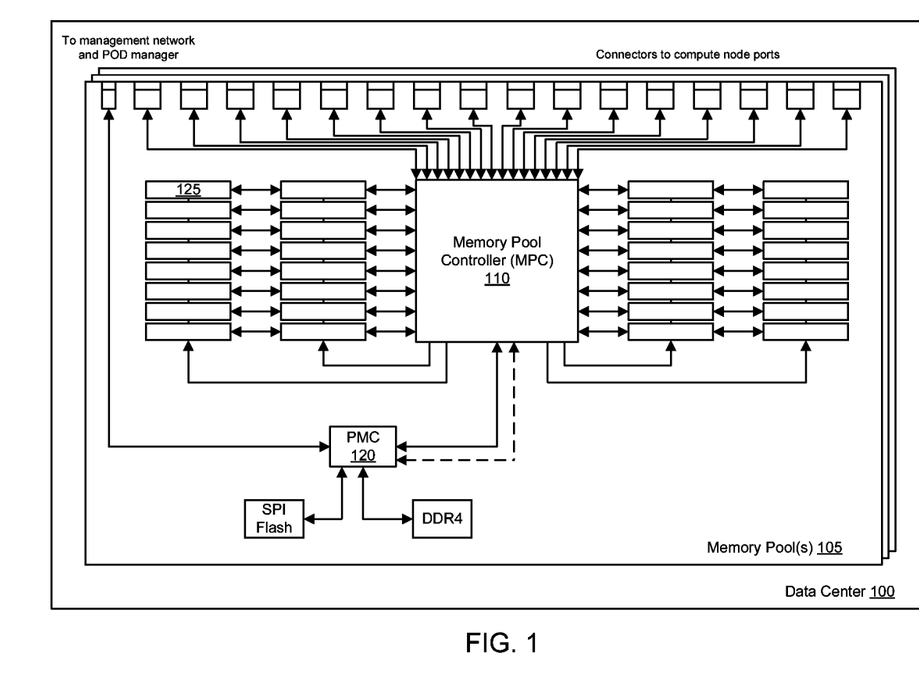
FIG. 1 illustrates a memory pool in accordance with an example embodiment.

FIG. 1 illustrates an example of a memory pool 105. The memory pool 105 can be included in a data center 100. The memory pool 105 can include a memory pool controller (MPC) 110 and a pool management controller (PMC) 120. The memory pool 105 can include a plurality of memory modules 125, such as dual in-line memory modules (DIMMs), for example. The plurality of memory modules 125 can form a pool of memory in the memory pool 105 that can be seen as a continuous pool of memory to other nodes in the system. Compute nodes (e.g., processors or cores) (not shown) in the data center 100 can be communicatively coupled through a communication interconnect to a front side of the MPC 110 via communication interfaces such as connectors to compute node ports. The memory modules 125 can be connected to back side(s) of the MPC 110 via memory ports. The compute node ports associated with the compute nodes and the memory ports associated with the memory modules 125 can be assigned with respective bandwidths. In some cases, the compute node ports can have an increased bandwidth in relation to the memory ports of the memory modules 125.

In one example, the memory pool 105 can include the PMC 120, which can be communicatively coupled to the MPC 110. The PMC 120 can configure the memory pool 105 based on requests from a data center manager (not shown). For example, management of the memory pool and collection of telemetry data of memory activity from each compute node to/from the memory pool can be collected by the PMC 120. In addition, the PMC 120 can be connected to other types of memory in the memory pool 105, such as serial peripheral interface (SPI) flash memory, DDR4 memory, and the like.

Figure 2:
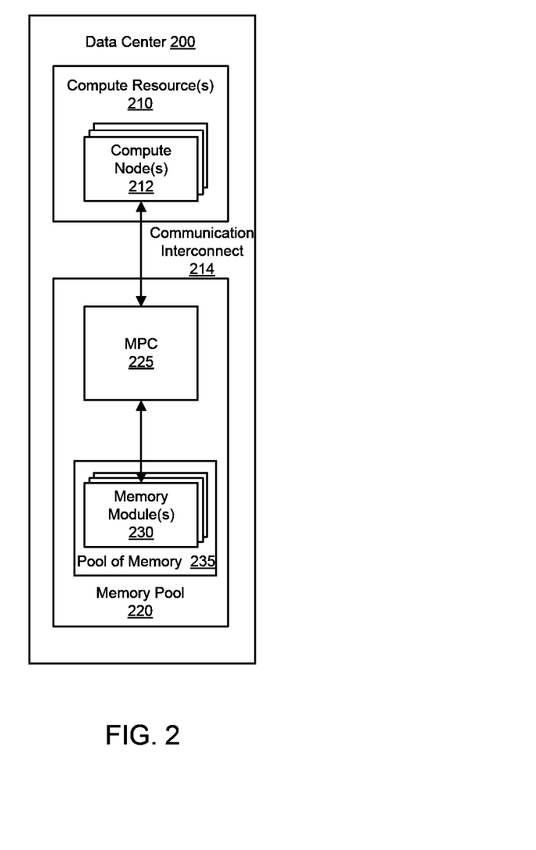
FIG. 2 illustrates a data center rack that includes a memory pool in accordance with an example embodiment.

FIG. 2 illustrates an example of a data center 200 that includes a memory pool 220. The memory pool 220 can include a memory pool controller (MPC) 225 that is coupled to a plurality of memory module(s) 230 in the memory pool 220. The plurality of memory module(s) 230 can form a pool of memory 235 in the memory pool 220. The MPC 225 can be connected to compute nodes 212 of compute resource(s) 210 in the data center 200. More specifically, ports of the MPC 225 can be connected to the compute nodes 212 of the compute resource(s) 210 via a communication interconnect 214. Nonlimiting examples of communications interconnects can include communication fabrics, dedicated cables, backplanes, fiber optics, wave guides, or the like, including any other technology enabling connectivity between a compute node and a memory pool.

In one example, the MPC 225 can translate data requests from a compute node 212 to corresponding memory of the memory pool 235 that is mapped to the compute node 212. For example, the MPC 225 can receive a data request from the compute node 212 to write data to a specific region of memory in the memory pool 235 that is mapped to that compute node 212. As another example, the MPC 225 can receive a data request from the compute node 212 to read data from a specific region of memory in the memory pool 235 that is mapped to that compute node 212. A pool management controller (PMC) in the memory pool 220 can configure the MPC 225 for the proper memory translations between the compute nodes 212 and the memory pool 235.

In one configuration, one or more compute nodes 212 can run a workload. The workload can involve reading/writing data from/to the memory modules 230 in the memory pool 235. In some cases, certain workloads running on one or more compute nodes 212 may need increased performance or bandwidth in comparison to other workloads running on different compute nodes 212. In other cases, workloads running on one or more compute nodes 212 can be associated with an increased priority level as compared to other workloads running on different compute nodes 212. For these cases, one attribute of the memory pool 235 that can be beneficial when allocating resources (or bandwidth) between workloads of varying priorities is the amount of bandwidth available across the memory pool 235, which in some cases can include a bandwidth limit imposed by the bandwidth of the communication interconnect 214. For example, the MPC 225 can take into account the amount of bandwidth available in or across the memory pool 235, including any bandwidth limits imposed by the communication interconnect 214, when allocating resources between workloads of varying priorities.

In one configuration, the MPC 225 can align the bandwidth of the memory pool 235 to respective workloads running on the compute nodes 212 by implementing a prioritized arbitration scheme between data requests from different compute nodes 212 in the data center 200. Depending on a bandwidth specification or a priority level of a given workload, data requests from those compute nodes 212 running the workload can be assigned a higher or lower priority. For example, for a workload with an increased priority level, data requests from compute nodes 212 that are running the workload can be filled at an increased priority level with respect to data requests for lower priority workloads, having been assigned a greater bandwidth out of the amount of available bandwidth in the memory pool 235 for the workload with the increased priority level. On the other hand, for a workload with a reduced priority level, data requests from compute nodes 212 that are running that workload can be filled at a reduced priority level with respect to data requests for increased priority workloads, having been assigned a lower bandwidth out of the amount of available bandwidth in the memory pool 235 for the workload with the reduced priority level. As a result, the prioritized arbitration scheme can enable a distribution of data requests, and corresponding bandwidth of the memory pool 235, to workloads that is proportional to their priority levels. In other words, the prioritized arbitration scheme can provide a distribution of data requests (and bandwidth) based on the different priority levels of the workloads running on the compute nodes 212.

The distribution of bandwidth can be managed according to any number of schemes, and any scheme capable of distributing bandwidth according to workload priority is considered to be within the present scope. In one example, the MPC 225 can align the bandwidth of the memory pool 235 to respective workloads running on the compute nodes 212 using a weighted round robin arbitration scheme. The weighted round robin arbitration scheme can be used to facilitate controlled sharing of the bandwidth of the memory pool 235. In this scheme, the MPC 225 can assign a weight value to each workload (or compute node 212 or group of compute nodes 212), and the weight value can be used to determine an amount of bandwidth of the memory pool 235 that is to be allocated to a given workload. Based on the round robin aspect of the prioritized arbitration scheme, each workload can be serviced in a set order, and a highest-priority workload can be serviced with an increased bandwidth as compared to a lowest-priority workload.

As an example, two workloads can be serviced using the weighted round robin arbitration scheme. In this example, a first workload can be allocated with 66% of the available bandwidth and a second workload can be allocated with 33% of the available bandwidth. In this example, the MPC 225 can process two data requests for the first workload before processing one data request for the second workload. In other words, based on the 2:1 ratio between the first workload and the second workload, the MPC 225 can process two data requests for the first workload for every one data request that is processed for the second workload. As a result, the first workload can be more prioritized than the second workload.

In one example, the MPC 225 can utilize appropriate arbitration scheme mechanisms other than weighted round robin for aligning the bandwidth of the memory pool 235 to respective workloads running on the compute nodes 212, such that different workloads can be assigned different priorities with respect to the bandwidth of the memory pool 235.

In one configuration, a bandwidth of a particular compute node 212 (or virtual machine) can be tracked over time and the bandwidth can be throttled (e.g., increased or decreased) accordingly. For example, activity from a virtual machine on a compute node 212 or core, or activity from multiple virtual machines on multiple compute nodes working in a coordinated fashion, can be tracked through an assigned resource monitoring identifier (RMID). The bandwidth per RMID can be monitored by a resource controller, and this information can be fed back to throttle requests from one or more compute nodes 212 (or cores) associated with the RMID. As a result, a more direct bandwidth centric solution can be provided as compared to a mere priority arbitration scheme.

In one example, based on an RMID scheme, multiple compute nodes 212 (or cores) associated with one RMID can share bandwidth allocated to that RMID. In another example, an RMID that is associated with one or more compute node ports can be a basis for tracking the bandwidth, thereby allowing multiple compute nodes 212 that are collectively executing the same workload to share a bandwidth level assigned to that RMID. In one example, a single compute node port can also have a unique RMID. The MPC 225 can assign RMIDs to individual compute nodes 212 or a group of compute nodes 212, and set a corresponding bandwidth level for each individual compute node 212 or group of compute nodes 212, in some cases via the associated compute node ports. The MPC 225 can be configured to track bandwidth limits, SLA limits, QoS limits, or the like, for respective compute node ports or a group of compute node ports based on the RMIDs. The MPC 225 can track memory traffic for the RMIDs and throttle compute node ports accordingly, such that the various limits imposed on compute node ports (or a group of compute node ports) can be met. In addition, the MPC 225 can monitor each of the RMIDs and the corresponding bandwidth being used by the RMIDs, and this information can be used to assess workload and resource balancing within the data center 200.

In one configuration, the MPC 225 can receive data requests from the compute nodes 212. The MPC 225 can assign each compute node 212 to one of a set of compute node priorities. The MPC 225 can send memory access commands to the memory pool 235 to perform each data request prioritized according to the set of compute node priorities. The data requests can be arbitrated as a function of the corresponding compute node priorities. The MPC 225 can send the memory access commands to the memory pool 235 according to a data request sequence. For example, the MPC 225 can generate a queue of the data requests for each compute node priority, and then the MPC 225 can generate the data request sequence by arbitrating the data requests in the queues as a function of the compute node priorities.

In one example, the MPC 225 can change the assigned compute node priority of a compute node 212 to a different compute node priority to modify a frequency of data requests from the compute node 212 in the data request sequence. In another example, the MPC 225 can regulate bandwidth of data requests from a compute node 212 to modify a frequency of data requests from the compute node 212 in the data request sequence. In yet another example, the MPC 225 can regulate entry of data requests from a compute node 212 into the queue for the compute node priority of the compute node 212 to modify a frequency of data requests from the compute node 212 in the data request sequence.

In one configuration, the MPC 225 can assign a priority indicator to each of the data requests based the compute node priority of the corresponding compute node 212, and the MPC 225 can generate the data request sequence as a function of the priority indicators of the data requests weighted according to the corresponding compute node priorities.

In one configuration, the MPC 225 can assign a bandwidth allocation to each compute node 212 according to the corresponding compute node priority. The MPC 225 can monitor a bandwidth usage for each compute node 212. The MPC 225 can determine an available bandwidth of the memory pool 235, and when the available bandwidth is below an available bandwidth threshold, the MPC 225 can regulate the bandwidth allocations of the compute nodes 212 to maximize an overall bandwidth usage of the memory pool 235 as a weighted function of the set of compute node priorities.

In one example, to regulate the bandwidth allocations of the compute nodes 212, the MPC 225 can compare the bandwidth usage to the bandwidth allocation for each of the compute nodes 212. The MPC 225 can identify a usage inefficiency of the memory pool 235 from the comparison of the bandwidth usages to the bandwidth allocations. The MPC 225 can regulate the bandwidth allocations of the compute nodes 212 to reduce the usage inefficiency according to the weighted function of the set of compute node priorities. In one example, when the usage inefficiency includes unused bandwidth of the memory pool 235, the MPC 225 can ignore the bandwidth allocation of the compute nodes 212 to utilize the unused bandwidth of the memory pool 234, or the MPC 225 can increase the bandwidth allocation of the compute nodes 212 to utilize the unused bandwidth of the memory pool 234. In another example, when the usage inefficiency includes insufficient available bandwidth of the memory pool 235 to allow a compute node 212 having a high compute node priority to achieve the corresponding bandwidth allocation, the MPC 225 can decrease the bandwidth allocation of the compute node 212 having a lower compute node priority.

Figure 3:
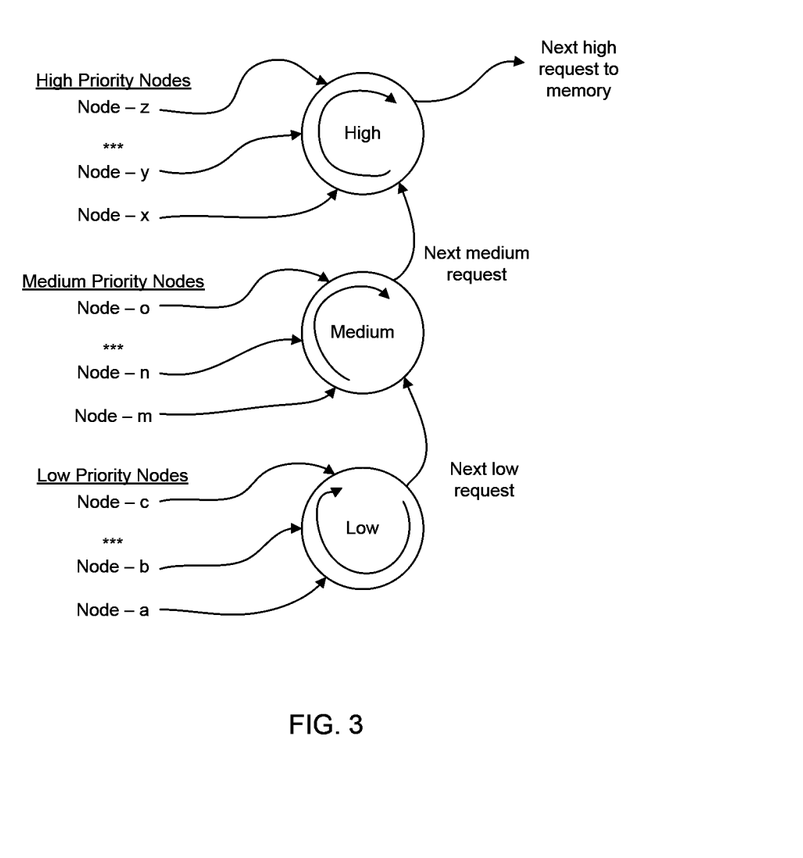
FIG. 3 illustrates a weighted round robin arbitration scheme for aligning a bandwidth of a memory pool to respective workloads in accordance with an example embodiment.

FIG. 3 illustrates an example of a weighted round robin arbitration scheme for aligning a bandwidth of a memory pool to respective workloads. The weighted round robin arbitration scheme can be implemented at a memory pool controller (MPC) in a memory pool of a data center. The MPC can receive data requests from various compute nodes in the data center. For example, the MPC can receive data requests from high priority compute nodes (e.g., nodes z, y and x), medium priority compute nodes (e.g., nodes o, n and m) and low priority compute nodes (e.g., nodes c, b and a). The MPC can service the data requests from the different compute nodes based on the priorities of the different compute nodes in accordance with the weighted round robin arbitration scheme. For example, data requests received from the high priority compute nodes can be filled by the MPC more quickly as compared to data requests received from the medium priority compute nodes and the low priority compute nodes. Data requests received from the medium priority compute nodes can be filled by the MPC less quickly as compared to data requests received from the high priority compute nodes, and more quickly as compared to data requests received from the low priority compute nodes. In addition, data requests received from the low priority compute nodes can be filled by the MPC less quickly as compared to data requests received from both the high priority compute nodes and the medium priority compute nodes. As a result, based on the weighted round robin arbitration scheme, the high priority compute nodes can be assigned a first amount of bandwidth, the medium priority compute nodes can be assigned a second amount of bandwidth and the low priority compute nodes can be assigned a third amount of bandwidth, where the first amount of bandwidth is greater than each of the second amount of bandwidth and the third amount of bandwidth, and the second amount of bandwidth is greater than the third amount of bandwidth.

Figure 4:
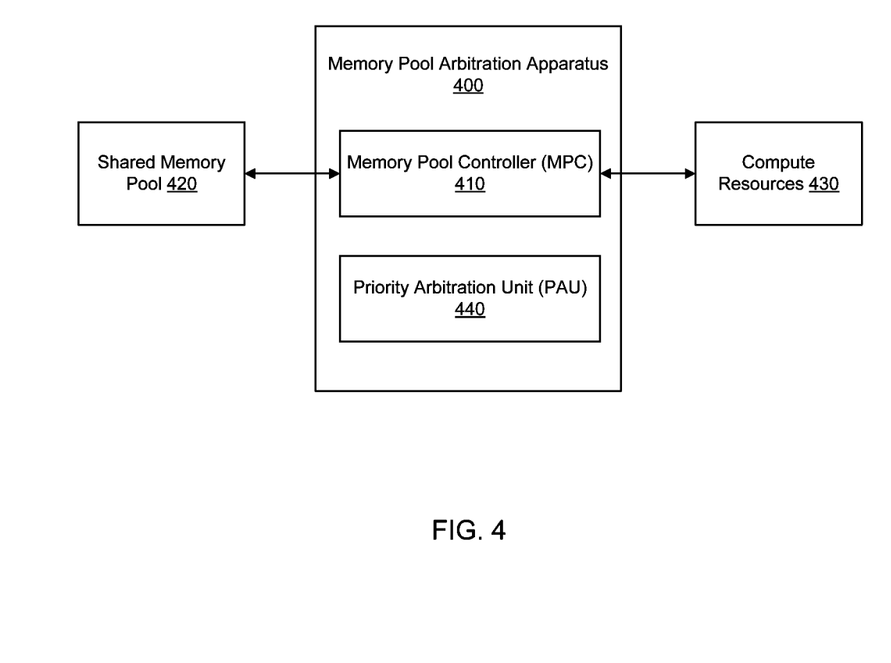
FIG. 4 illustrates a memory pool arbitration apparatus in accordance with an example embodiment.

FIG. 4 illustrates an example of a memory pool arbitration apparatus 400. The apparatus 400 can include a memory pool controller (MPC) 410. The MPC 410 can be communicatively coupled between a shared memory pool 420 of disaggregated memory devices and a plurality of compute resources 430 (e.g., compute nodes, virtual machines, and the like). The compute resources 430 can each represent a workload running on a compute node or a virtual machine, or a workload running on multiple compute nodes or multiple virtual machines. In one example, the MPC 410 can receive a plurality of data requests from the plurality of compute resources 430. The MPC 410 can assign each compute resource 430 to one of a set of compute resource priorities. The MPC 410 can send memory access commands to the shared memory pool 420 to perform each data request prioritized according to the set of compute resource priorities. In addition, the apparatus 400 can include a priority arbitration unit (PAU) 440 communicatively coupled to the MPC 410. The PAU 440 can arbitrate the plurality of data requests as a function of the corresponding compute resource priorities.

In one example, to send the memory access commands to the shared memory pool 420 to fill each data request according to the set of compute resource priorities, the MPC 410 can send the memory access commands to the shared memory pool 420 according to a data request sequence provided by the PAU 440. Further, the PAU 440 can generate a queue of the plurality of data requests for each compute resource priority, and generate the data request sequence by arbitrating the data requests in the queues as a weighted function of the plurality of compute resource priorities.

In one example, the MPC 410 can change the assigned compute resource priority of a compute resource 430 to a different compute resource priority to modify a frequency of data requests from the compute resource 430 in the data request sequence. In another example, the MPC 410 can regulate bandwidth of data requests from a compute resource 430 to modify a frequency of data requests from the compute resource 430 in the data request sequence. In yet another example, the PAU 440 can regulate entry of data requests from a compute resource 430 into the queue for the compute resource priority of the compute resource 430 to modify a frequency of data requests from the compute resource 430 in the data request sequence.

In one example, the MPC 410 can assign a priority indicator to each of the plurality of data requests based the compute resource priority of the corresponding compute resource 430, and the PAU 440 can generate the data request sequence as a function of the priority indicators of the plurality of data requests weighted according to the corresponding compute resource priorities.

In one example, the MPC 410 can assign a bandwidth allocation to each compute resource 430 according to the corresponding compute resource priority. In another example, the MPC 410 can include a resource monitor that monitors a bandwidth usage for each compute resource 430 and sends the bandwidth usage for each compute resource 430 to the PAU 440. The PAU 440 can determine an available bandwidth of the shared memory pool 420. When the available bandwidth is below an available bandwidth threshold, the PAU 440 can regulate the bandwidth allocations of at least a portion of the plurality of compute resources 430 to maximize, or otherwise increase, an overall bandwidth usage of the shared memory pool 420 as a weighted function of the set of compute resource priorities. In this example, the available bandwidth threshold can be an amount of available bandwidth, including any bandwidth limitations limit imposed by communication interconnect, where performance of the shared memory pool decreases. The PAU 440 can regulate the bandwidth allocations by enforcing bandwidth limits, nonlimiting examples of which can include SLA agreements, QoS standards or agreements, class of service (CoS) limits, or the like.

In one example, the PAU 440 can regulate the bandwidth allocations of at least a portion of the plurality of compute resources 430. More specifically, the PAU 440 can compare the bandwidth usage to the bandwidth allocation for each of the plurality of compute resources 430, identify a usage inefficiency of the shared memory pool 420 from the comparison of the bandwidth usages to the bandwidth allocations, and regulate the bandwidth allocations of at least a portion of the plurality of compute resources 430 to reduce the usage inefficiency according to the weighted function of the set of compute resource priorities.

In one example, the usage inefficiency can include unused bandwidth of the shared memory pool 420. In this case, the PAU 440 can notify the MPC 410 to ignore the bandwidth allocation of at least a portion of the plurality of compute resources 430 to utilize the unused bandwidth of the shared memory pool 420. Alternatively, the PAU 440 can notify the MPC 410 to increase the bandwidth allocation of at least a portion of the plurality of compute resources 430 to utilize the unused bandwidth of the shared memory pool 420.

In one example, the usage inefficiency can include insufficient available bandwidth of the shared memory pool 420 to allow a compute resource 430 having a high compute resource priority to achieve the corresponding bandwidth allocation. In this case, the PAU 440 can decrease the bandwidth allocation of at least one compute resource 430 having a lower compute resource priority.

In one example, the MPC 410 can assign a resource monitor identification (RMID) to each of the plurality of compute resources 430. The compute resources 430 that are executing the same workload can thus be monitored by a RMID associated with the workload. The MPC 410 can include a bandwidth regulator to control a level of data bandwidth between the plurality of compute resources 430 and the shared memory pool 420. In addition, the MPC 410 can include a resource monitor unit to monitor data bandwidth usage for each RMID, and send the data bandwidth usage for each RMID to the bandwidth regulator.

In one example, a class of service (CloS) scheme can be used to prioritize and monitor workloads. For example, workloads can be assigned to specific CLoS levels that represent different levels of workload prioritization. In one implementation, a CloS level can be assigned to a particular RMID, which allows, among other things, workloads of a given CLoS level to be monitored under an RMID. In some cases, interfaces can be exposed to facilitate the definition of various CLoS levels (e.g., CLoS x=x GBps), by the MPC 410 or the PAU 440, for example.

Figure 5:
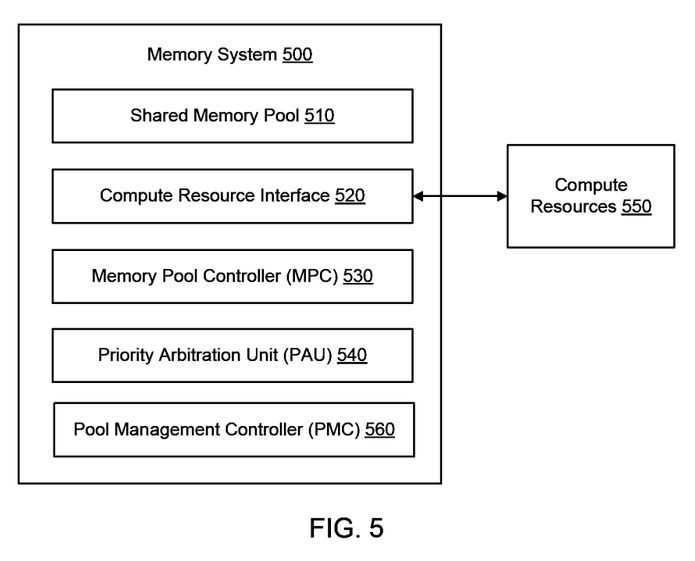
FIG. 5 illustrates a memory system in accordance with an example embodiment.

FIG. 5 illustrates an example of a memory system 500. The memory system 500 can include a shared memory pool 510 of disaggregated memory devices. The memory system 500 can include a compute resource interface 520 coupled to the shared memory pool 510. The memory system 500 can include a MPC 530 coupled to the shared memory pool 510 and to the compute resource interface 520. The MPC 530 can receive a plurality of data requests from a plurality of compute resources 550 through the compute resource interface 520. The MPC 530 can assign each compute resource 550 of the plurality of compute resources 550 to one of a set of compute resource priorities. The MPC 530 can send memory access commands to the shared memory pool 510 to perform each data request prioritized according to the set of compute resource priorities. In addition, the memory system 500 can include a PAU 540 communicatively coupled to the MPC 530. The PAU 540 can arbitrate the plurality of data requests as a weighted function of the corresponding compute resource priorities. The memory system 500 can also include a PMC 560 communicatively coupled to the MPC 530 that supports the management of the MPC 530 and the arbitration of the workloads. In some cases, the PMC 560 can provide input to the MPC 530 to facilitate changes in priority for a workload/compute node(s), for example. The PMC 560 can thus allow the priorities of workloads to be dynamically reconfigured to respond to workload changes in the data center.

Figure 6:
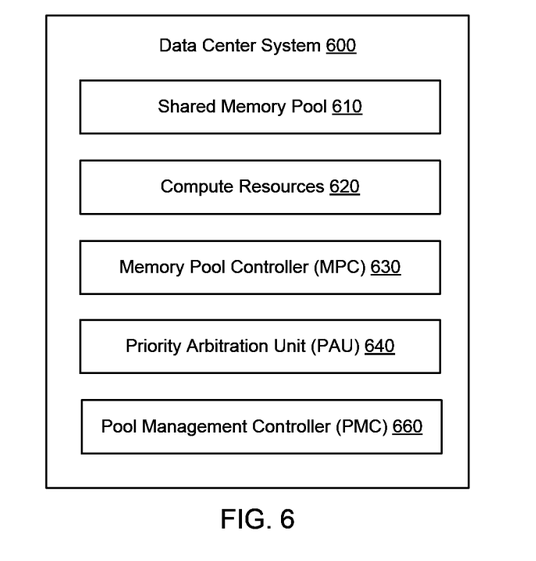
FIG. 6 illustrates a data center system in accordance with an example embodiment.

FIG. 6 illustrates an example of a data center system 600. The data center system 600 can include a shared memory pool 610. The data center system 600 can include a plurality of compute resources 620 communicatively coupled to the shared memory pool 610. The data center system 600 can include a MPC 630 communicatively coupled between the shared memory pool 610 and the plurality of compute resources 620 to control data access. The MPC 630 can receive a plurality data requests from the plurality of compute resources 620. The MPC 630 can assign a priority indicator to each of the plurality of data requests. The MPC 630 can send memory access commands to the shared memory pool 610 to fill each data request according to the priority indicator. Furthermore, the data center system 600 can include a PAU 640 (e.g., where the PAU 640 can be included in the MPC 630) to generate the priority indicator for each data request based on a compute resource priority assigned to each compute resource 620. The PAU 640 can distribute the plurality of data requests to the shared memory pool 610 based on the compute resource priority according to an arbitration schedule. The arbitration schedule can be at least partially defined by a SLA agreement, a QoS metric or standard, a CoS limit, or the like. The compute resource priority can include at least two priority levels, and the PAU 640 can distribute the plurality of data requests to the shared memory pool 610 as a function of an available shared memory pool resource (e.g., memory bandwidth, memory access latency and/or memory speed). The data center system 600 can also include a PMC 660 communicatively coupled to the MPC 630 that supports the management of the MPC 630 and the arbitration of the workloads. In some cases, the PMC 660 can provide input to the MPC 630 to facilitate changes in priority for a workload/compute node(s), for example. The PMC 660 can thus allow the priorities of workloads to be dynamically reconfigured to respond to workload changes in the data center.

Figure 7:
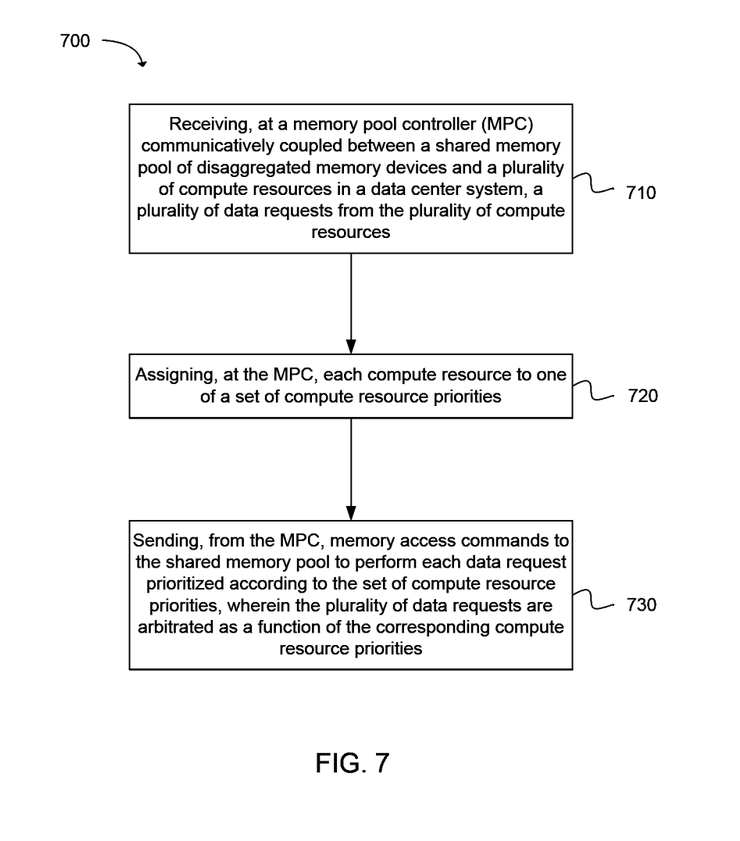
FIG. 7 is a flowchart illustrating operations for prioritizing data requests in accordance with an example embodiment.

Another example provides a method 700 for prioritizing data requests. The method can be executed as instructions on a machine, where the instructions are included on at least one computer readable medium or one non-transitory machine-readable storage medium. The method can include the operation of receiving, at a MPC communicatively coupled between a shared memory pool of disaggregated memory devices and a plurality of compute resources in a data center system, a plurality of data requests from the plurality of compute resources, as in block 710. The method can include the operation of assigning, at the MPC, each compute resource to one of a set of compute resource priorities, as in block 720. The method can include the operation of sending, from the MPC, memory access commands to the shared memory pool to perform each data request prioritized according to the set of compute resource priorities, wherein the plurality of data requests are arbitrated as a function of the corresponding compute resource priorities, as in block 730.

The present disclosure additionally provides general computing systems that can employ the present technology. The computing system can include a processor in communication with a memory. The memory can include any device, combination of devices, circuitry, and the like that is capable of storing, accessing, organizing, and/or retrieving data. Non-limiting examples include SANs (Storage Area Network), cloud storage networks, volatile or non-volatile RAM, phase change memory, optical media, hard-drive type media, and the like, including combinations thereof. The computing system additionally includes a local communication interface for connectivity between the various components of the system. For example, the local communication interface can be a local data bus and/or any related address or control busses as may be desired.

The computing system can also include an I/O (input/output) interface for controlling the I/O functions of the system, as well as for I/O connectivity to devices outside of the computing system. A network interface can also be included for network connectivity. The network interface can control network communications both within the system and outside of the system. The network interface can include a wired interface, a wireless interface, a Bluetooth interface, optical interface, and the like, including appropriate combinations thereof. Furthermore, the computing system can additionally include a user interface, a display device, as well as various other components that would be beneficial for such a system.

The processor can include a single processor or multiple processors, including single core processors and multi-core processors. A processor can include general purpose processors, specialized processors such as central processing units (CPUs), graphics processing units (GPUs), digital signal processors (DSPs), microcontrollers (MCUs), microprocessors, embedded controllers (ECs), embedded processors, field programmable gate arrays (FPGAs), network processors, hand-held or mobile processors, application-specific instruction set processors (ASIPs), application-specific integrated circuit processors (ASICs), co-processors, and the like or other types of specialized processors, as well as base band processors used in transceivers to send, receive, and process wireless communications. Additionally, a processor can be packaged in numerous configurations, which is not limiting. For example, a processor can be packaged in a common processor package, a multi-core processor package, a system-on-chip (SoC) package, a system-in-package (SiP) package, a system-on-package (SOP) package, and the like.

Various techniques, or certain aspects or portions thereof, can take the form of program code (i.e., instructions) embodied in tangible media, such as CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a RAM, EPROM, flash drive, optical drive, magnetic hard drive, solid state drive, or other medium for storing electronic data. One or more programs that can implement or utilize the various techniques described herein can use an application programming interface (API), reusable controls, and the like. Such programs can be implemented in a high level procedural or object-oriented programming language to communicate with a computer system. However, the program(s) can be implemented in assembly or machine language, if desired. In any case, the language can be a compiled or interpreted language, and combined with hardware implementations. Exemplary systems or devices can include without limitation, laptop computers, tablet computers, desktop computers, smart phones, computer terminals and servers, storage databases, and other electronics which utilize circuitry and programmable memory, such as household appliances, smart televisions, digital video disc (DVD) players, heating, ventilating, and air conditioning (HVAC) controllers, light switches, and the like.

EXAMPLES

The following examples pertain to specific invention embodiments and point out specific features, elements, or steps that can be used or otherwise combined in achieving such embodiments.

In one example, there is provided a memory pool arbitration apparatus. The apparatus can include a memory pool controller (MPC) configured to communicatively couple between a shared memory pool of disaggregated memory devices and a plurality of compute resources. The MPC can receive a plurality of data requests from the plurality of compute resources. The MPC can assign each compute resource to one of a set of compute resource priorities. The MPC can send memory access commands to the shared memory pool to perform each data request prioritized according to the set of compute resource priorities. The apparatus can include a priority arbitration unit (PAU) communicatively coupled to the MPC, the PAU to arbitrate the plurality of data requests as a function of the corresponding compute resource priorities.

In one example of the apparatus, to send the memory access commands to the shared memory pool to fill each data request according to the set of compute resource priorities, the MPC is further to send the memory access commands to the shared memory pool according to a data request sequence provided by the PAU.

In one example of the apparatus, the PAU is further to: generate a queue of the plurality of data requests for each compute resource priority; and generate the data request sequence by arbitrating the data requests in the queues as a weighted function of the plurality of compute resource priorities.

In one example of the apparatus, the MPC is further to: change the assigned compute resource priority of a compute resource to a different compute resource priority to modify a frequency of data requests from the compute resource in the data request sequence.

In one example of the apparatus, the MPC is further to: regulate bandwidth of data requests from a compute resource to modify a frequency of data requests from the compute resource in the data request sequence.

In one example of the apparatus, the PAU is further to: regulate entry of data requests from a compute resource into the queue for the compute resource priority of the compute resource to modify a frequency of data requests from the compute resource in the data request sequence.

In one example of the apparatus, the plurality of compute resources comprises a plurality of compute nodes.

In one example of the apparatus, the MPC is further to assign a priority indicator to each of the plurality of data requests based the compute resource priority of the corresponding compute resource; and the PAU is further to generate the data request sequence as a function of the priority indicators of the plurality of data requests weighted according to the corresponding compute resource priorities.

In one example of the apparatus, the MPC is further to assign a bandwidth allocation to each compute resource according to the corresponding compute resource priority.

In one example of the apparatus, the MPC further comprises: a resource monitor unit to: monitor a bandwidth usage for each compute resource; and send the bandwidth usage for each compute resource to the PAU.

In one example of the apparatus, the PAU is further to: determine an available bandwidth of the shared memory pool; and if the available bandwidth is below an available bandwidth threshold, regulate the bandwidth allocations of at least a portion of the plurality of compute resources to maximize an overall bandwidth usage of the shared memory pool as a weighted function of the set of compute resource priorities.

In one example of the apparatus, the available bandwidth threshold is an amount of available bandwidth where performance of the shared memory pool decreases.

In one example of the apparatus, to regulate the bandwidth allocations of at least a portion of the plurality of compute resources, the PAU is further to: compare the bandwidth usage to the bandwidth allocation for each of the plurality of compute resources; identify a usage inefficiency of the shared memory pool from the comparison of the bandwidth usages to the bandwidth allocations; and regulate the bandwidth allocations of at least a portion of the plurality of compute resources to reduce the usage inefficiency according to the weighted function of the set of compute resource priorities.

In one example of the apparatus, the usage inefficiency comprises unused bandwidth of the shared memory pool, and the PAU is further configured to notify the MPC to ignore the bandwidth allocation of at least a portion of the plurality of compute resources to utilize the unused bandwidth of the shared memory pool.

In one example of the apparatus, the usage inefficiency comprises unused bandwidth of the shared memory pool, and the PAU is further configured to notify the MPC to increase the bandwidth allocation of at least a portion of the plurality of compute resources to utilize the unused bandwidth of the shared memory pool.

In one example of the apparatus, the usage inefficiency comprises insufficient available bandwidth of the shared memory pool to allow a compute resource having a high compute resource priority to achieve the corresponding bandwidth allocation, and the PAU is further configured to decrease the bandwidth allocation of at least one compute resource having a lower compute resource priority.

In one example of the apparatus, the PAU is further to regulate the bandwidth allocations by enforcing bandwidth limits, wherein the bandwidth limits are established by a service level agreement (SLA).

In one example of the apparatus, at least a portion of the plurality of compute resources is a compute node.

In one example of the apparatus, at least a portion of the plurality of compute resources are each a workload.

In one example of the apparatus, a compute resource can include multiple compute nodes executing the same workload.

In one example of the apparatus, the MPC is further to assign a resource monitor identification (ID) to each of the plurality of compute resources, wherein the multiple compute nodes executing the same workload are monitored by the resource monitor according to the resource monitor ID.

In one example of the apparatus, at least a portion of the plurality of compute resources is a virtual machine.

In one example, there is provided a memory system. The system can include a shared memory pool of disaggregated memory devices. The system can include a compute resource interface coupled to the shared memory pool. The system can include a memory pool controller (MPC) coupled to the shared memory pool and to the compute resource interface. The MPC can receive a plurality of data requests from a plurality of compute resources through the compute resource interface. The MPC can assign each compute resource of the plurality of compute resources to one of a set of compute resource priorities. The MPC can send memory access commands to the shared memory pool to perform each data request prioritized according to the set of compute resource priorities. The system can include a priority arbitration unit (PAU) communicatively coupled to the MPC, the PAU to arbitrate the plurality of data requests as a weighted function of the corresponding compute resource priorities.

In one example of the system, the MPC further comprises: a controller to assign a resource monitor identification (ID) to each of the plurality of compute resources; a bandwidth regulator to control a level of data bandwidth between the plurality of compute resources and the shared memory pool; and a resource monitor unit to: monitor a data bandwidth usage for each resource monitor ID; and send the data bandwidth usage for each resource monitor ID to the bandwidth regulator.

In one example of the system, the plurality of compute resources comprises a plurality of compute nodes.

In one example of the system, at least a portion of the plurality of compute resources are each a workload.

In one example of the system, a compute resource can include multiple compute nodes executing the same workload.

In one example of the system, the MPC is further to assign a resource monitor identification (ID) to each of the plurality of compute resources, wherein the multiple compute nodes executing the same workload are monitored by the resource monitor.

In one example, there is provided a data center system. The system can include a shared memory pool. The system can include a plurality of compute resources communicatively coupled to the shared memory pool. The system can include a memory pool controller (MPC) communicatively coupled between the shared memory pool and the plurality of compute resources to control data access. The MPC can receive a plurality data requests from the plurality of compute resources. The MPC can assign a priority indicator to each of the plurality of data requests. The MPC can send memory access commands to the shared memory pool to fill each data request according to the priority indicator.

In one example of the system, the system further comprises: a priority arbitration unit (PAU) to generate the priority indicator for each data request based on a compute resource priority assigned to each compute resource.

In one example of the system, the MPC comprises the PAU.

In one example of the system, the PAU is further to: distribute the plurality of data requests to the shared memory pool based on the compute resource priority according to an arbitration schedule.

In one example of the system, the arbitration schedule is at least partially defined by an established a service level agreement (SLA).

In one example of the system, the compute resource priority includes at least two priority levels, and the PAU distributes the plurality of data requests to the shared memory pool as a function of an available shared memory pool resource.

In one example of the system, the shared memory pool resource comprises memory bandwidth, memory access latency, memory speed, or a combination thereof.

In one example of the system, the plurality of compute resources comprises a plurality of compute nodes.

In one example of the system, the MPC further comprises: a controller to assign a resource monitor identification (ID) to each of the plurality of compute resources; a bandwidth regulator to control a level of data bandwidth between the plurality of compute resources and the shared memory pool; and a resource monitor unit to: monitor a data bandwidth usage for each resource monitor ID; and send the data bandwidth usage for each resource monitor ID to the bandwidth regulator.

In one example of the system, the plurality of compute resources comprises a plurality of compute nodes.

In one example of the system, at least a portion of the plurality of compute resources are each a workload.

In one example of the system, a compute resource can include multiple compute nodes executing the same workload.

In one example of the system, the MPC is further to assign a resource monitor identification (ID) to each of the plurality of compute resources, wherein the multiple compute nodes executing the same workload are monitored by the resource monitor.

In one example, a method is provided for memory pool arbitration. The method can include the operation of: receiving, at a memory pool controller (MPC) communicatively coupled between a shared memory pool of disaggregated memory devices and a plurality of compute resources in a data center system, a plurality of data requests from the plurality of compute resources. The method can include the operation of: assigning each compute resource to one of a set of compute resource priorities. The method can include the operation of: sending memory access commands to the shared memory pool to perform each data request prioritized according to the set of compute resource priorities, wherein the plurality of data requests are arbitrated as a function of the corresponding compute resource priorities.

In one example of the method, the method can further include the operations of: generating a queue of the plurality of data requests for each compute resource priority; and generating the data request sequence by arbitrating the data requests in the queues as a weighted function of the plurality of compute resource priorities.

In one example of the method, the method can further include the operation of: changing the assigned compute resource priority of a compute resource to a different compute resource priority to modify a frequency of data requests from the compute resource in the data request sequence.

In one example of the method, the method can further include the operation of: regulating bandwidth of data requests from a compute resource to modify a frequency of data requests from the compute resource in the data request sequence.

In one example of the method, the method can further include the operation of: regulating entry of data requests from a compute resource into the queue for the compute resource priority of the compute resource to modify a frequency of data requests from the compute resource in the data request sequence.

In one example of the method, the method can further include the operation of: assigning a bandwidth allocation to each compute resource according to the corresponding compute resource priority.

In one example of the method, the method can further include the operations of: determining an available bandwidth of the shared memory pool; and regulating, when the available bandwidth is below an available bandwidth threshold, the bandwidth allocations of at least a portion of the plurality of compute resources to maximize an overall bandwidth usage of the shared memory pool as a weighted function of the set of compute resource priorities.

While the forgoing examples are illustrative of the principles of invention embodiments in one or more particular applications, it will be apparent to those of ordinary skill in the art that numerous modifications in form, usage and details of implementation can be made without the exercise of inventive faculty, and without departing from the principles and concepts of the disclosure.

What is claimed is:
1. A memory pool arbitration apparatus, comprising:
a memory pool controller (MPC) configured to communicatively couple between a shared memory pool of disaggregated memory devices and a plurality of compute resources, the MPC to:

receive a plurality of data requests from the plurality of compute resources;

assign each compute resource to one of a set of compute resource priorities;

assign a bandwidth allocation to each compute resource according to a corresponding compute resource priority; and send memory access commands to the shared memory pool to perform each data request prioritized according to the set of compute resource priorities;

a priority arbitration unit (PAU) communicatively coupled to the MPC, the PAU to arbitrate the plurality of data requests as a function of the corresponding compute resource priorities; and wherein the MPC further comprises a resource monitor unit to:

monitor a bandwidth usage for each compute resource; and send the bandwidth usage for each compute resource to the PAU, wherein the PAU is further to:

determine an available bandwidth of the shared memory pool; and if the available bandwidth is below an available bandwidth threshold, regulate the bandwidth allocations of at least a portion of the plurality of compute resources to maximize an overall bandwidth usage of the shared memory pool as a weighted function of the set of compute resource priorities.

2. The apparatus of claim 1, wherein the PAU is further to:
generate a queue of the plurality of data requests for each compute resource priority; and generate a data request sequence by arbitrating the data requests in the queues as a weighted function of the plurality of compute resource priorities.

3. The apparatus of claim 2, wherein the MPC is further to: regulate bandwidth of data requests from a compute resource to modify a frequency of data requests from the compute resource in the data request sequence.

4. The apparatus of claim 2, wherein the PAU is further to: regulate entry of data requests from a compute resource into the queue for the compute resource priority of the compute resource to modify a frequency of data requests from the compute resource in the data request sequence.

5. The apparatus of claim 2, wherein:
the MPC is further to assign a priority indicator to each of the plurality of data requests based on the compute resource priority of the corresponding compute resource; and the PAU is further to generate the data request sequence as a function of the priority indicators of the plurality of data requests weighted according to the corresponding compute resource priorities.

6. The apparatus of claim 1, wherein, to regulate the bandwidth allocations of at least a portion of the plurality of compute resources, the PAU is further to:

compare the bandwidth usage to the bandwidth allocation for each of the plurality of compute resources;

identify a usage inefficiency of the shared memory pool from the comparison of the bandwidth usages to the bandwidth allocations; and regulate the bandwidth allocations of at least a portion of the plurality of compute resources to reduce the usage inefficiency according to the weighted function of the set of compute resource priorities.

7. The apparatus of claim 6, wherein the usage inefficiency comprises unused bandwidth of the shared memory pool, and the PAU is further configured to notify the MPC to ignore the bandwidth allocation of at least a portion of the plurality of compute resources to utilize the unused bandwidth of the shared memory pool.

8. The apparatus of claim 6, wherein the PAU is further to regulate the bandwidth allocations by enforcing bandwidth limits, wherein the bandwidth limits are established by a service level agreement (SLA).

9. The apparatus of claim 1, wherein at least a portion of the plurality of compute resources are each a compute node.

10. The apparatus of claim 1, wherein at least a portion of the plurality of compute resources are each a workload.

11. The apparatus of claim 10, wherein a compute resource can include multiple compute nodes executing the same workload.

12. The apparatus of claim 11, wherein the MPC is further to assign a resource monitor identification (ID) to each of the plurality of compute resources, wherein the multiple compute nodes executing the same workload are monitored by the resource monitor according to the resource monitor ID.

13. The apparatus of claim 1, wherein at least a portion of the plurality of compute resources are each a virtual machine.

14. The apparatus of claim 1, wherein the MPC further comprises:

a controller to assign a resource monitor identification (ID) to each of the plurality of compute resources;

a bandwidth regulator to control a level of data bandwidth between the plurality of compute resources and the shared memory pool; and a resource monitor unit to:

monitor a data bandwidth usage for each resource monitor ID; and send the data bandwidth usage for each resource monitor ID to the bandwidth regulator.

15. A data center system, comprising:
a shared memory pool;
a plurality of compute resources communicatively coupled to the shared memory pool;
a memory pool controller (MPC) communicatively coupled between the shared memory pool and the plurality of compute resources to control data access, the MPC to:

assign a bandwidth allocation to each compute resource according to a corresponding compute resource priority;

receive a plurality data requests from the plurality of compute resources;

assign a priority indicator to each of the plurality of data requests; and send memory access commands to the shared memory pool to fill each data request according to the priority indicator; and a priority arbitration unit (PAU) communicatively coupled to the MPC, the PAU to generate the priority indicator for each data request based on a compute resource priority assigned to each compute resource; and wherein the MPC further comprises a resource monitor unit to:

monitor a bandwidth usage for each compute resource; and send the bandwidth usage for each compute resource to the PAU, wherein the PAU is further to:

determine an available bandwidth of the shared memory pool; and if the available bandwidth is below an available bandwidth threshold, regulate the bandwidth allocations of at least a portion of the plurality of compute resources to maximize an overall bandwidth usage of the shared memory pool as a weighted function of the corresponding compute resource priority.

16. The system of claim 15, wherein the PAU is further to: distribute the plurality of data requests to the shared memory pool based on the compute resource priority according to an arbitration schedule.

17. The system of claim 15, wherein the compute resource priority includes at least two priority levels, and the PAU distributes the plurality of data requests to the shared memory pool as a function of an available shared memory pool resource.

18. The system of claim 17, wherein the shared memory pool resource comprises memory bandwidth, memory access latency, memory speed, or a combination thereof.

19. A method for memory pool arbitration, comprising:
receiving, at a memory pool controller (MPC) communicatively coupled between a shared memory pool of disaggregated memory devices and a plurality of compute resources in a data center system, a plurality of data requests from the plurality of compute resources;
assigning each compute resource to one of a set of compute resource priorities;
sending memory access commands to the shared memory pool to perform each data request prioritized according to the set of compute resource priorities, wherein the plurality of data requests are arbitrated as a function of corresponding compute resource priorities;
determining an available bandwidth of the shared memory pool; and
regulating, when the available bandwidth is below an available bandwidth threshold, bandwidth allocations of at least a portion of the plurality of compute resources to maximize an overall bandwidth usage of the shared memory pool as a weighted function of the set of compute resource priorities.

20. The method of claim 19, further comprising:
generating a queue of the plurality of data requests for each compute resource priority; and
generating a data request sequence by arbitrating the data requests in the queues as a weighted function of the plurality of compute resource priorities.

21. The method of claim 20, further comprising regulating bandwidth of data requests from a compute resource to modify a frequency of data requests from the compute resource in the data request sequence.

22. The method of claim 20, further comprising regulating entry of data requests from a compute resource into the queue for the compute resource priority of the compute resource to modify a frequency of data requests from the compute resource in the data request sequence.

* * * * *